United States Patent
Henderson

(10) Patent No.: US 6,449,343 B1
(45) Date of Patent: Sep. 10, 2002

(54) SYSTEM AND METHOD FOR CREATION AND CONVERSION OF ELECTRONIC MAIL MESSAGES FOR DELIVERY TO TELEPHONE RECIPIENTS

(75) Inventor: Donnie Henderson, Manalapan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/436,094

(22) Filed: Nov. 8, 1999

(51) Int. Cl.$^7$ ................................................ H04M 3/42
(52) U.S. Cl. ............................ 379/88.14; 379/88.16; 379/93.24
(58) Field of Search ................. 79/88.01, 88.11, 79/88.13, 88.14, 88.16, 88.22, 93.24, 100.08, 100.13; 704/258, 278; 709/206

(56) References Cited

U.S. PATENT DOCUMENTS

| | | | | |
|---|---|---|---|---|
| 4,837,798 A | * | 6/1989 | Cohen et al. | 379/88.14 |
| 5,475,738 A | * | 12/1995 | Penzias | 379/88.14 |
| 5,530,740 A | * | 6/1996 | Irribarren et al. | 379/88.17 |
| 5,608,786 A | * | 3/1997 | Gordon | 370/352 |
| 5,715,370 A | * | 2/1998 | Luther et al. | 704/270.1 |
| 5,737,395 A | * | 4/1998 | Irribarren | 379/88.13 |
| 5,870,454 A | * | 2/1999 | Dahlen | 379/88.14 |
| 5,940,478 A | * | 8/1999 | Vaudreuil et al. | 379/88.18 |
| 6,061,718 A | * | 5/2000 | Nelson | 709/206 |
| 6,072,862 A | * | 6/2000 | Srinivasan | 379/100.08 |
| 6,104,789 A | * | 8/2000 | Lund | 379/92.23 |
| 6,138,096 A | * | 10/2000 | Chan et al. | 704/235 |
| 6,181,956 B1 | * | 1/2001 | Koskan | 455/566 |
| 6,233,318 B1 | * | 5/2001 | Picard et al. | 379/88.17 |
| 6,249,808 B1 | * | 6/2001 | Seshadri | 709/206 |
| 6,313,734 B1 | * | 11/2001 | Weiss et al. | 379/88.15 |
| 6,373,985 B1 | * | 4/2002 | Hu et al. | 382/229 |
| 6,374,223 B1 | * | 4/2002 | Donaldson et al. | 704/270 |
| 2001/0033564 A1 | * | 10/2001 | Hickman | 370/352 |
| 2002/0037074 A1 | * | 3/2002 | Dowens et al. | 379/88.14 |

* cited by examiner

*Primary Examiner*—Scott L. Weaver

(57) ABSTRACT

An automated message processing system is disclosed which receives an electronic mail message, coverts the mail message into speech and delivers the converted message to one or more telephone recipients identified in the electronic mail message. The system includes means for creating an electronic mail message which identifies one or more telephone recipients, means for converting the electronic mail message to speech and means for delivering the converted electronic mail message to the one or more telephone recipients identified in the electronic mail message. The system of the present invention utilizes text-to-speech techniques to convert the text in the electronic mail message into speech.

2 Claims, 7 Drawing Sheets

SYSTEM AND METHOD FOR CREATION AND CONVERSION OF ELECTRONIC MAIL MESSAGES FOR DELIVERY TO TELEPHONE RECIPIENTS

BACKGROUND OF THE INVENTION

The present invention relates to the field of communications and more particularly to a system and method for converting and delivering an electronic mail message as speech to one or more telephone recipients. Electronic mail (or "e-mail") message systems allow transmission of messages between computer-based users connected on a distributed network. Depending on the capabilities of a particular message system, graphics, audio, or simple text messages can be sent between these users.

Today, more and more people use electronic mail and the Internet as a means for communicating with others and gathering and disseminating information. When a user is at home or work where the user has a computer, sending and receiving e-mail or accessing the Internet is relatively quick and easy. Communicating with others who have similar e-mail systems is obviously also very easy. However, many people still do not have e-mail accounts and thus people with e-mail accounts have no choice but to communicate with these people through conventional methods of communication like the telephone. Additionally, some people that do have e-mail may still prefer to communicate by conventional means such as by the telephone. Many of these people still consider e-mail to be a very impersonal and unprofessional way to communicate.

Furthermore, the popularity of e-mail as a means of communication has resulted in the problem of people having too many messages in their e-mail accounts. Many of these e-mails may be unwanted solicitations or so-called "SPAM" messages. Thus, many times, each e-mail is typically not given the attention and care as say, a voice-based message may be given by a user.

Accordingly, it would be desirable to have an electronic mail system which could provide the user with more varied ways to convey messages, especially to people who do not have access to e-mail or who may not want to use their e-mail.

SUMMARY OF THE INVENTION

The present invention is a messaging system which provides for the creation, conversion and delivery of electronic mail messages as speech to one or more telephone recipients. The system receives an electronic mail message, converts the electronic mail message into speech and delivers the converted message to a telephone recipient identified in the electronic mail message. The system includes means for creating an electronic mail message which identifies a telephone recipient, means for converting the electronic mail message to speech and means for delivering the converted electronic mail message to the telephone recipient identified in the electronic mail message. The system of the present invention utilizes text-to-speech technology to convert the text in the electronic mail message into speech. In one embodiment of the present invention, the intended telephone recipient is identified in the subject line of the electronic mail message. Alternatively, the telephone recipient may be identified in other sections of the electronic mail message, such as the body of the message.

The system of the present invention may provide for secure transmission of the electronic mail messages as speech by requiring a user to enter in a personal identification number or password to authorize delivery of the electronic mail message to the telephone recipient. Additionally, the user creating the message may specify a personal identification number which the recipient of the message must properly enter before the recipient is allowed to listen to the message.

A user interface for using the message processing system of the present invention may implemented on a computer screen which allows a user to specify the telephone number of an intended recipient of the electronic mail message. The system may be a local system where an electronic mail message is created, converted and sent as speech on a user's local computer or preferably, on a centralized system where a number of remote users, such as electronic mail clients may send electronic mail messages which are converted into speech and delivered to a variety of intended telephone recipients.

In addition to the converted electronic mail message, a user may identify an audio file which may also be played for the telephone recipient. The user may specify that the audio file be played before, after or even inserted during the converted text message.

DETAILED DESCRIPTION OF THE INVENTION

Figure 1:
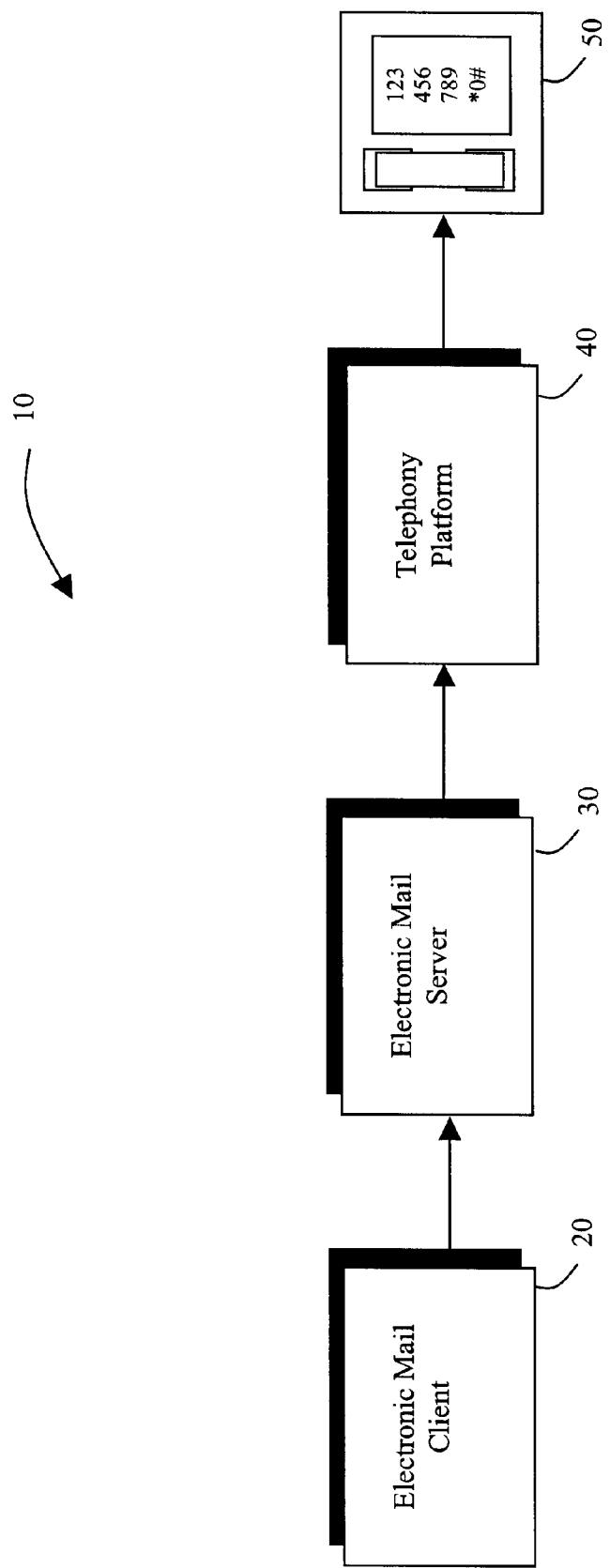
FIG. 1 illustrates a message processing system in accordance with the teachings of the present invention.

Referring to FIG. 1, a messaging system 10 is shown for the creation, conversion and delivery of electronic mail messages as speech to one or more telephone recipients. The messaging system 10 includes at least one electronic mail client 20, an electronic mail server 30, a telephony interface or platform 40 and a telephone 50. In one embodiment, the electronic mail server 30 and telephony platform 40 are separate components but may easily be integrated as a single component incorporating both the electronic mail server 30 and telephony platform 40. In a preferred embodiment, telephone 50 is a conventional telephony device for receiving and transmitting voice communications. The example of FIG. 1 shows a regular voice telephone 50 which may be connected to the local network via a dedicated subscriber line. Alternatively, the telephone may be any form of wireless telephone connected to the local network through an intermediate wireless network, such as a cellular telephone network.

In the present invention, the electronic mail client 20 is in communication with electronic mail server 30. Although only one electronic mail client is shown, typically a number of electronic mail clients will be in communication with the electronic mail server. Electronic mail server 30 is responsible for processing and storing incoming electronic mail messages sent from the electronic mail client(s). In one embodiment of the present invention, the electronic mail messages are transmitted to the telephony platform 40 for further processing, as discussed below.

Figure 2:
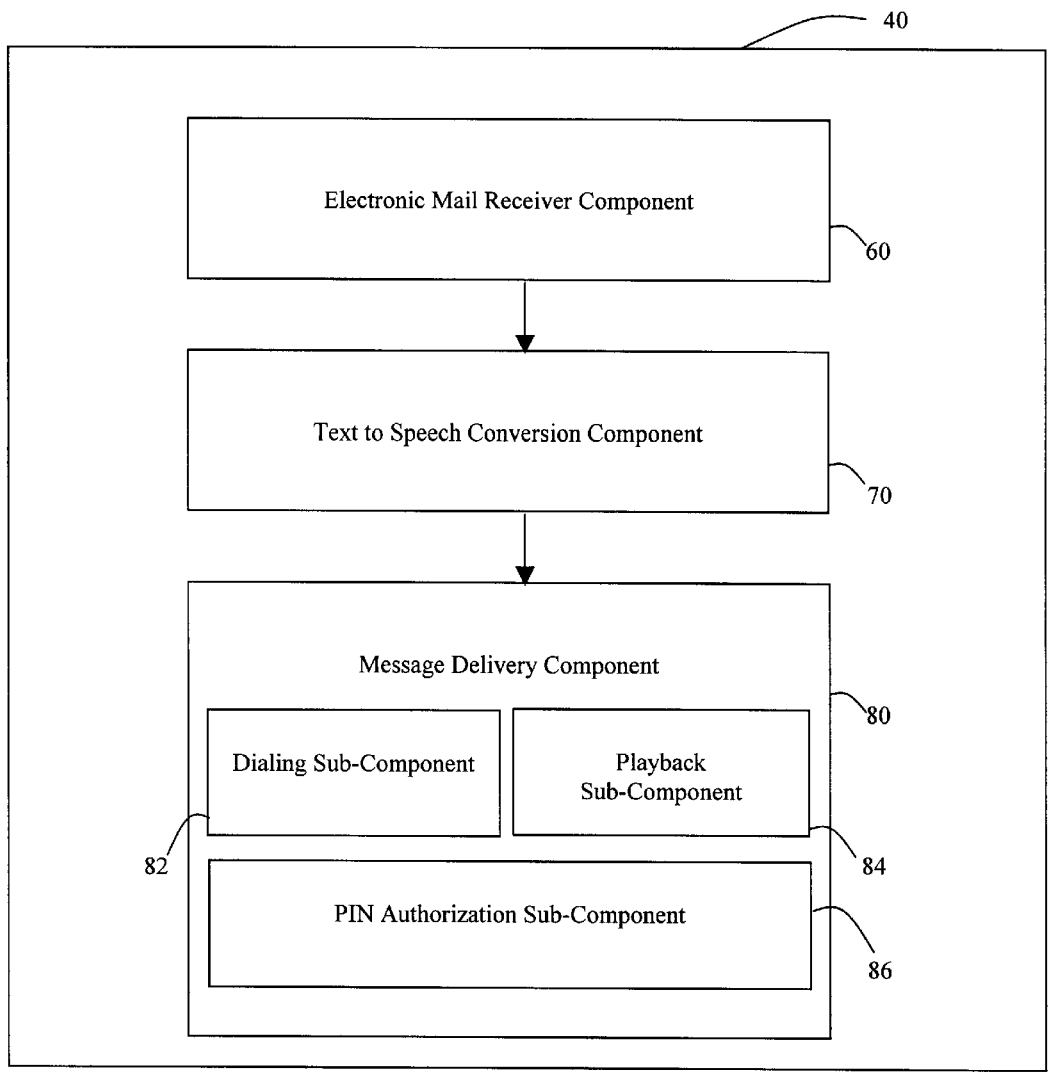
FIG. 2 illustrates a telephony platform for use in accordance with the teachings of the present invention.

Referring to FIG. 2, a more detailed view of the telephony platform 40 is shown. The telephony platform 40 preferably includes an electronic mail receiver component 60, a Text-To-Speech (TTS) conversion component 70 and a message delivery component 80. Generally, an electronic mail message is received by the electronic mail receiver component 60. Once the electronic mail message is received, the receiver component 60 transmits the message to the TTS conversion component 70. The TTS conversion component 70 converts the text of the electronic mail message into speech. The converted message is then delivered as speech to the intended recipient by the message delivery component 80. The message delivery component 80 may further include a dialing sub-component 82, a playback sub-component 84 and a PIN authorization sub-component 86 as discussed in more detail later herein.

For background purposes, TTS systems or components which permit automatic synthesis of speech from a text are well known in the art. Typically, a TTS system receives an input of generic text (e.g. from a memory, typed in at a keyboard or from an electronic mail message text as described herein), composed of words and other symbols such as digits and abbreviations, along with punctuation marks, and generates a speech waveform based on such text.

In the present invention, the TTS conversion component 70 may be implemented on a computer system. The computer system will typically include a central processing unit (CPU) and a number of input/output devices. The CPU has access to a memory. The memory holds a copy of a TTS component or facility. The TTS facility holds the instructions for practicing the exemplary embodiment to the present invention. The computer system may also include a network adapter for connecting the CPU with the network. The computer system may additionally include a modem and an audio output device (such as a loudspeaker) for generating audio output. The computer preferably has a display and a pointing device, such as a mouse, trackball, joystick, etc. for controlling the movements of a cursor across the display. The computer also includes a keyboard which is used by the user for entering alpha-numeric information and control keystroke sequences.

Figure 3:
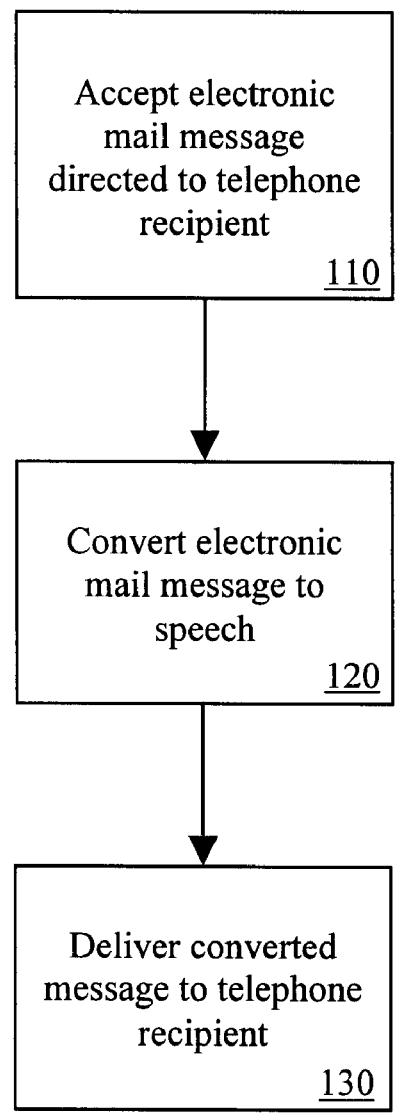
FIG. 3 is a flow chart which illustrates a method of processing messages in accordance with the teachings of the present invention.

In a simplified process shown in FIG. 3, an electronic mail message directed to a telephone recipient is accepted by the system, step 110. Typically, to send an electronic mail message, a connection to the Internet and access to a mail server which can forward electronic mail messages is required. The standard protocol used for sending electronic mail messages on the Internet is called Simple Mail Transfer Protocol (SMTP). SMTP works in conjunction with Post Office Protocol (POP) servers. When an electronic mail message is sent, the sender's computer forwards the mail message to an SMTP mail server which appropriately forwards the message to the telephony platform 40.

Once the message is received by the telephony platform 40, the message will be converted into speech, step 120. Typically, only the text body portion of the electronic mail message is converted to speech, but other portions of the message, such as the sender's identifying information may be converted to speech. Once the text of the electronic mail message is converted into speech, the message is delivered as speech to the telephone recipient identified, step 130. Preferably, delivery is performed through the message delivery component 80. In the message delivery component 80 shown in FIG. 2, the dialing sub-component 82 dials the recipient's telephone number and upon connection, the speech playback sub-component 84, plays the converted speech to the recipient on the connected line through a public switched telephone network or alternatively, through any wireless network, such as a cellular calling network. Ideally, if the recipient is, for example, at home, or has their wireless phone available, the recipient will simply answer the call and listen to the message. If the recipient does not answer the call initiated by the message delivery component 80, the message may be left on the recipient's answering machine or voicemail, as is known in the art.

As used herein, the public switched telephone network may be a telephone network provided by a local exchange carrier such as one of the Regional Bell Operating Companies or it may be a telephone network provided by a long distance carrier such as AT&T. Another example of a public switched telephone network is the combined network provided by a local exchange carrier and a long distance carrier. The network may be either electrically or optically based or may involve combinations of those two technologies. The network may be digital or analog. Two examples of suitable digital networks are a packet network and a frame relay network, such as the existing packet and frame relay networks now provided by carriers such as AT&T.

The system of the present invention is adaptable for a variety of network configurations. In one embodiment, the system is localized, for example, to a user's personal computer which handles the creation, conversion and delivery of the electronic mail message. For example, the user may have an e-mail client resident on the user's computer which allows creation of an electronic mail message, a TTS facility for converting the electronic mail message to speech, and a delivery component for dialing up the intended recipient and a playback component for playing the converted speech to the recipient. Preferably, the present system operates in a more centralized configuration where a number of remote electronic mail clients are in communication with a number of electronic mail servers, which in turn, are in communication with a centralized telephony platform. The centralized telephony platform will process, convert and deliver the electronic mail messages sent by the remote electronic mail clients.

Figure 4:
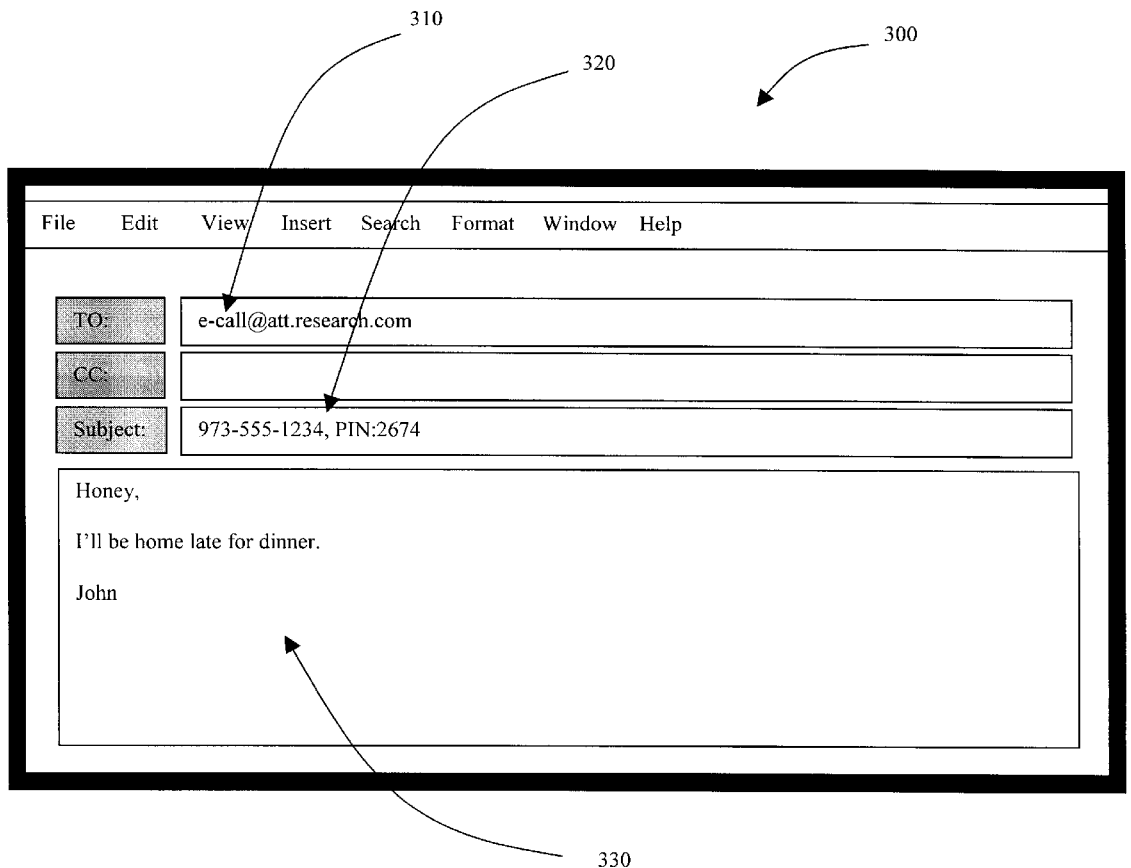
FIG. 4 is an exemplary screen display of the present system in operation in accordance with the teachings of the present invention.

In the present invention, the system functionality is provided to the user through a user screen or interface as shown in FIG. 4. The user interface may be provided on a computer as an electronic mail client which is in communication with an electronic mail server, as discussed earlier herein or may additionally be provided on a hand held computing device or other similar device.

An exemplary user interface for the voicemail system of the present invention is now shown in FIG. 4. The user interface includes a screen 300 which provides a user with an electronic mail message form to be completed. In an exemplary embodiment, the user interface screen includes a "TO" section 310 for specifying the intended recipient, a "Subject" section 320 and a "message body" section 330. In an exemplary embodiment, the user completes the "TO" section 310 with an address to specify that the electronic mail message is intended for eventual speech delivery. As used herein, "E-call@att.research.com" is an exemplary address which directs the electronic message to the proper mail server/telephony platform for processing and delivery as speech.

The user further completes the "Subject" section 320 of the electronic mail form by specifying the telephone number of the intended recipient of the message. The telephone number is typically in the form of XXX-YYY-YYYY where XXX represents a three digit area code and YYY-YYYY represents seven digit number code. It is contemplated that any valid telephone number may be entered in the "Subject" section 320, including foreign telephone numbers and any required prefixes. The user's message may then be completed within message body section 330. The user may type any length of message, theoretically to an almost unlimited amount of characters, however, shorter messages, such as a hundred words or less are preferable. The completed text message is then ready to be eventually converted to speech and delivered to the telephone number specified by the user in "Subject" section 320.

Once the electronic mail message is completed, the completed mail message is sent to the electronic mail server. Typically, the first part of the electronic mail message received by the electronic mail server is typically a header portion. The header will contain information the electronic mail server needs in order to deliver the message properly. The relevant header fields are illustrated below.

From: johndoe@attworldnet.com
Date: Tue, 19 Oct 1999 16:43:21-0500 (CDT)
To: e-call@att.research.com
Subject: 973-555-1234

Once the electronic mail server receives an electronic mail message with the header "TO" addressed to, for example, "e-call@att.research.com", the electronic mail server routes the electronic mail message to the appropriate telephony interface or platform. The telephony platform receives the electronic mail message and processes the message for delivery as speech to the recipient telephone number identified in the header "Subject" field. In the example shown in FIG. 4, the recipient at telephone number "973-555-1234" will be delivered the message "Honey, I'll be home later for dinner. John."

Additionally, as also shown in FIG. 4, the system may include a security feature to prevent unauthorized messaging by a user. In one embodiment, the security feature is administered by a personal identification number (PIN) authorization sub-component 86 as shown in FIG. 2. Referring again to FIG. 4, to properly send an electronic mail message as speech, the user is required to enter in a PIN in the electronic mail message screen 300. In this exemplary embodiment, the PIN code is entered in the "Subject" section 320 of the electronic mail message. Alternatively, the PIN code may be included in other sections of the electronic mail message, such as in the "TO" section 310 or the body of the message section 330. Once the electronic mail message is transmitted by the electronic mail server to the telephony platform, the PIN code is validated to determine if the user if authorized to send the message. Validation may be performed, for example, by comparing the user's PIN code with a database of valid PIN codes for which messaging is allowed. Alternatively, the PIN code may be in the form of a password or other authorization code which is issued by the authority which administers the messaging system. Typically, the PIN code or password will be in the form a predetermined amount of combination of numbers and/or letters which either the user selects or is assigned to the user by the system.

The PIN code feature of the present system may also provide secure messaging at the sending and/or receiving end of the message. The example discussed above deals mainly with a sender authorized PIN where the sender of the message has to provide their PIN to authorize delivery of the message. This sender authorized PIN may be known simply as a "PIN" or alternatively as an "S-PIN." Once the PIN or "S-PIN" is provided, the "S-PIN" is then validated by the system to determine if the user is authorized to send messages. The user may also specify that the recipient of the message be required to enter in a PIN code, i.e. via the receiver's telephone, to be able to listen to the message. To accomplish this, the user may enter in an "R-PIN" in the subject line of the message. The term "R-PIN" simply is an exemplary designation which identifies to the system that this message will have to be authorized or approved by the recipient before delivery is completed. Thus, a party receiving the message encoded with an "R-PIN", must correctly enter in the "R-PIN" within their telephone before the receiving party is allowed to listen to the message. Prompting and acceptance of an "R-PIN" may be provided via an Interactive Voice Response Unit (IVRU) as is known in the art. Once the recipient enters in a code which matches the "R-PIN" specified by the sender, the message is played to the recipient.

Figure 5:
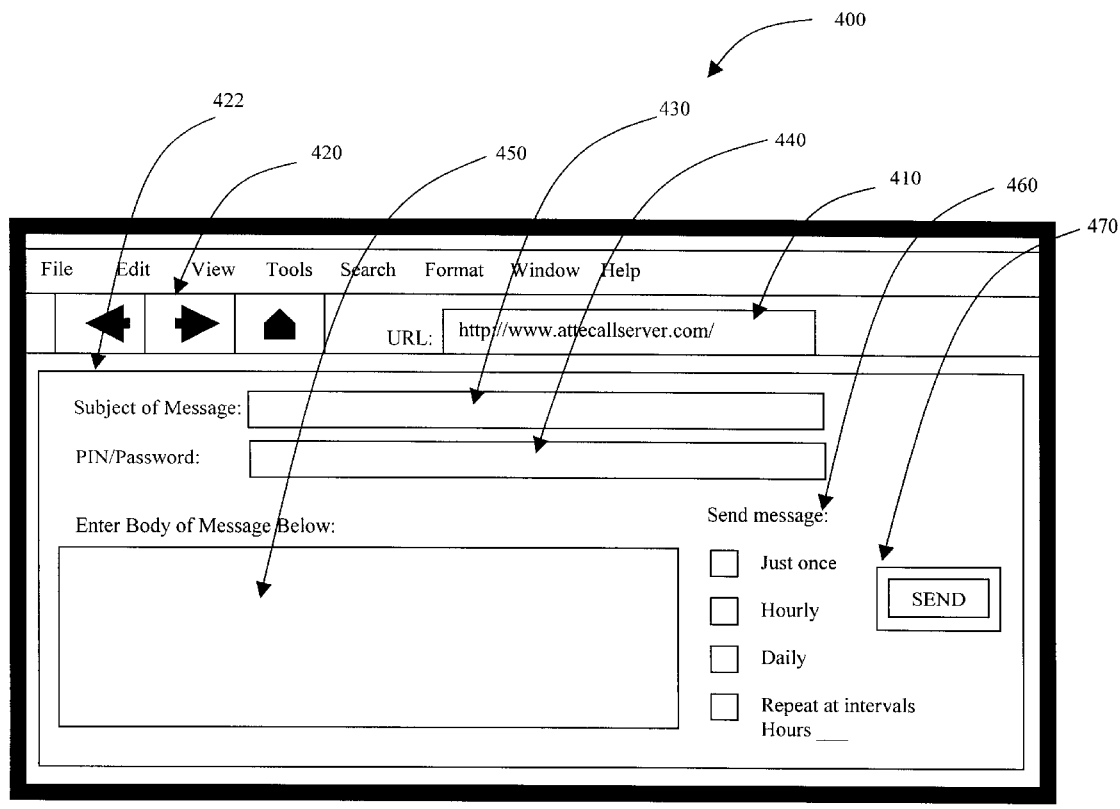
FIG. 5 is another exemplary screen display of the present system in operation in accordance with the teachings of the present invention.
Figure 6:
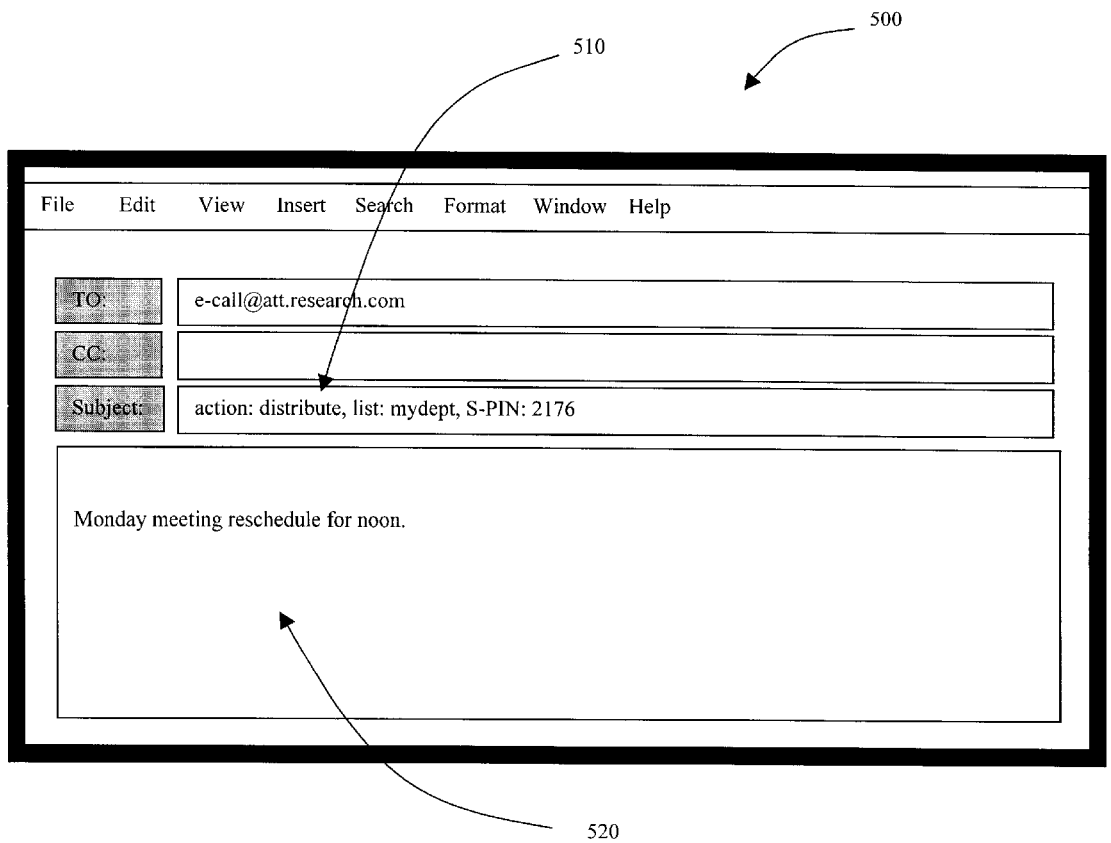
FIG. 6 is yet another exemplary screen display of the present system in operation in accordance with the teachings of the present invention.

Referring now to FIG. 5, the voicemail user interface of the present invention may be implemented within a generic World Wide Web (WWW) browser screen 400. The screen 400 includes a location active region 410 is where the URLs may be typed or entered. Presently, the messaging system is accessing information from an exemplary "www.atte-callserver.com" home page. Adjacent to the location region 410 is a row of interactive buttons 420 which help navigate the WWW and below the row of interactive buttons 420 is the active window 422 of the WWW Browser 400. Active window 422 is where, for example, hypertext markup language files are displayed. As shown in FIG. 6, the electronic mail message may be sent online by completing sections 430, 440, 450 and 460. For example, the user may place a desired recipient's telephone number in section 430, their PIN in section 440 and a desired message within section 450.

In the present invention, additional delivery options may be specified for the message delivery. For example, as shown in FIG. 5, the user may specify certain delivery intervals, section 460, for which the message will be repeated. The message may be delivered just once to the intended recipient, or alternatively, hourly, daily or at user specified intervals. Once the appropriate sections have been completed on the online form, the user presses the "SEND" button 470 to deliver the message. Pressing the "SEND" button 470 causes the system to send the message to, for example, an electronic mail server which processes the message for delivery.

As shown in FIG. 6, the messaging system can distribute an electronic message to one or more recipients. The recipients may be individually identified in the electronic message itself or alternatively, the listing of recipients may be contained in a file created by the user, such as the "mydept" list shown for exemplary purposes in FIG. 6. In operation, the user inserts an "action" command, such as "distribute" within the subject section 510 of the electronic message screen 500. The system detects the "distribute" command which thereby indicates to the system that the message is intended for one or more recipients as specified by the user. The message is then distributed to the recipients identified in the "mydept" list as specified by the user in the subject section 510 of the electronic message. Typically, the "mydept" list would contain a collection of desired recipients' telephone numbers. The user would be able to maintain the "mydept" list, e.g. via a customer service web site or e-mail interface wherein the user would be able to add, delete and modify distribution lists. Alternatively, the user may specify the list of intended recipients directly in the electronic mail message. This may be done by listing each recipient's telephone number in the electronic message, such as in the subject line separated by, e.g. semi-colons, or directly in the message body section 520.

Figure 7:
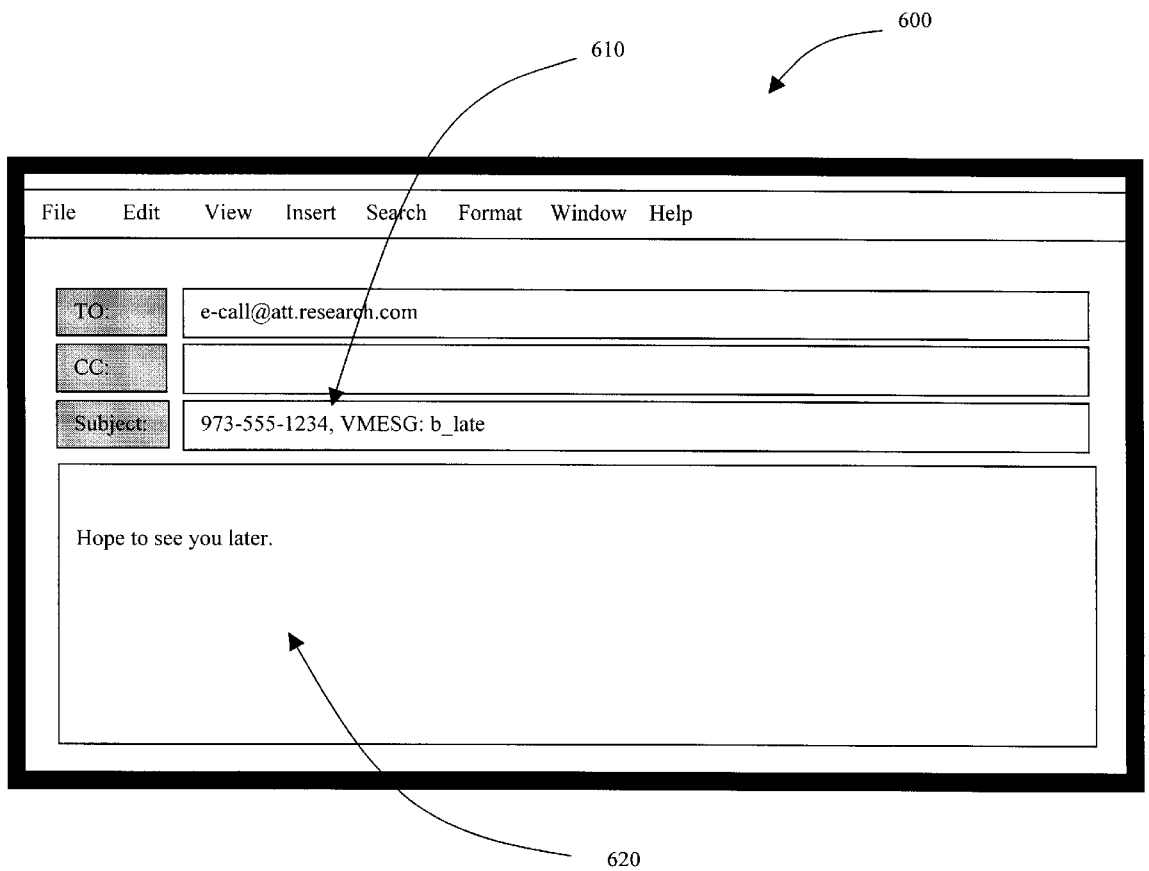
FIG. 7 is yet still another exemplary screen display of the present system in operation in accordance with the teachings of the present invention.

In a further embodiment of the present invention as shown in FIG. 7, the messaging system may be configured to send pre-recorded audio "snippets" or files to supplement the electronic mail messages slated for TTS conversion, as discussed above. These audio "snippets" may be configured to play either before, after, or inserted between a portion of the TTS converted message. For example, as shown in FIG. 7, the user inserts the command "VMESG: b_late" in the subject section 610 of the electronic mail message. The system receives the command "VMESG: b_late" and plays the audio file "b_late" to the intended recipient. In another variation of this embodiment, the commands "VMESG_ pre" and "VMESG _post" may be inserted in the subject line 610 of the electronic mail message screen 600 to designate the order of playback wherein "VMESG _pre" designates that the audio "snippet" be played before the TTS converted message 620 and "VMESG _post" designates that the audio "snippet" be played after the TTS converted message. These audio "snippets" may be uploaded, for example, to the user's e-call service account resident, for example, on the telephony platform where they could be subsequently identified in messages for playback to certain recipients. The file may also be attached as a file attachment, e.g. in MPEG, MP3, WAV, AAC or other similar format, to the actual electronic mail message for eventual playback to the recipient.

In the present invention, the user may be billed for sending message(s) in a variety of ways. The user may associate particular telephone numbers, in accord with an aspect of the invention, with respective billing accounts. For example, the user may specify that all messages that the user places via the messaging system are to be billed to a particular billing account, for example, a credit card account. As another example, the user may specify that all messages that the user sends to a business associate via the system are to be billed to another account, e.g., a business telephone number. The new user may also specify a default billing account for all other messages that the user places via the system, in which the default billing account may be the user's system service number or home telephone number. The system may also provide the messages delivery service free of charge to the customer as an additional service bundled in with a communication service package.

It will be apparent to those skilled in the art that many changes and substitutions can be made to the system and method described herein without departing from the spirit and scope of the invention as defined by the appended claims.

I claim:

1. A messaging system comprising:

means for creating an electronic mail message which identifies one or more telephone recipients;

means for converting the electronic mail message to speech; and means for delivering the converted electronic mail message to the one or more telephone recipients identified in the electronic mail message, wherein the electronic mail message identifies the one or more telephone recipients' telephone numbers, the one or more telephone recipients' telephone numbers being identified in a subject line of the electronic mail message.

2. A method processing electronic mail messages for delivery as speech to at least one telephone recipient, the method comprising the steps of:

receiving an electronic mail message which identifies the at least one telephone recipient;

converting the electronic mail message to speech; and delivering the converted electronic mail message to the at least one telephone recipient, wherein the electronic mail message identifies the telephone number of the at least one telephone recipient, the telephone number of the at least one telephone recipient being in the subject line of the electronic mail message.

\* \* \* \* \*